May 1, 1934.  C. L. JORDAN  1,956,766
POWER TAKE-OFF AND HOIST ADAPTED FOR TRACTORS
Filed Nov. 14, 1931   2 Sheets-Sheet 1

INVENTOR.
Christopher L. Jordan
BY Townsend & Loftus
ATTORNEYS.

May 1, 1934.  C. L. JORDAN  1,956,766
POWER TAKE-OFF AND HOIST ADAPTED FOR TRACTORS
Filed Nov. 14, 1931  2 Sheets-Sheet 2
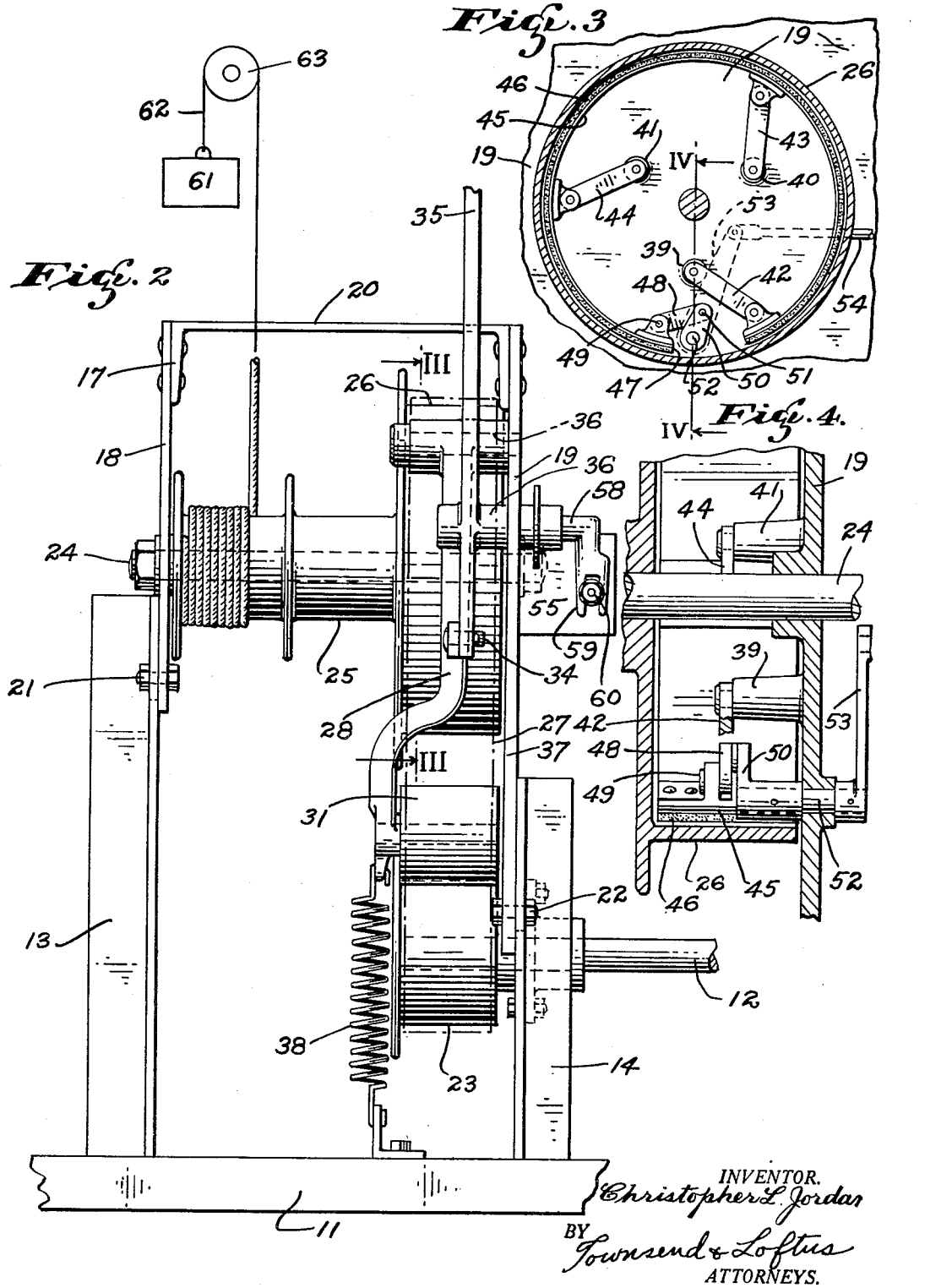
INVENTOR.
Christopher L. Jordan
BY Townsend & Loftus
ATTORNEYS.

Patented May 1, 1934

1,956,766

UNITED STATES PATENT OFFICE 1,956,766

POWER TAKE-OFF AND HOIST ADAPTED FOR TRACTORS

Christopher L. Jordan, Belmont, Calif.

Application November 14, 1931, Serial No. 575,143

4 Claims. (Cl. 192—11)

This invention relates to power take-off and hoisting means, especially adapted for application to tractors, although the invention is applicable to other devices and, in fact, it may be used with practically any power driven rotating shaft.

An object of my invention is the provision of a means for hoisting heavy objects securely and safely.

Another object of my invention is the provision of a means for hoisting and lowering objects and for maintaining them at any desired height.

Another object of my invention is the provision of a simple control means.

Other objects of my invention will become apparent from a reading of the appended description taken in connection with the accompanying drawings forming a part of this specification.

Referring to such drawings—

Fig. 2 is an end elevation looking from the right side of Fig. 1.

Fig. 3 is a section taken along the line III—III of Fig. 2, looking in the direction of the arrows.

Fig. 4 is a section taken on the line IV—IV of Fig. 3, looking in the direction of the arrows.

Figure 1:
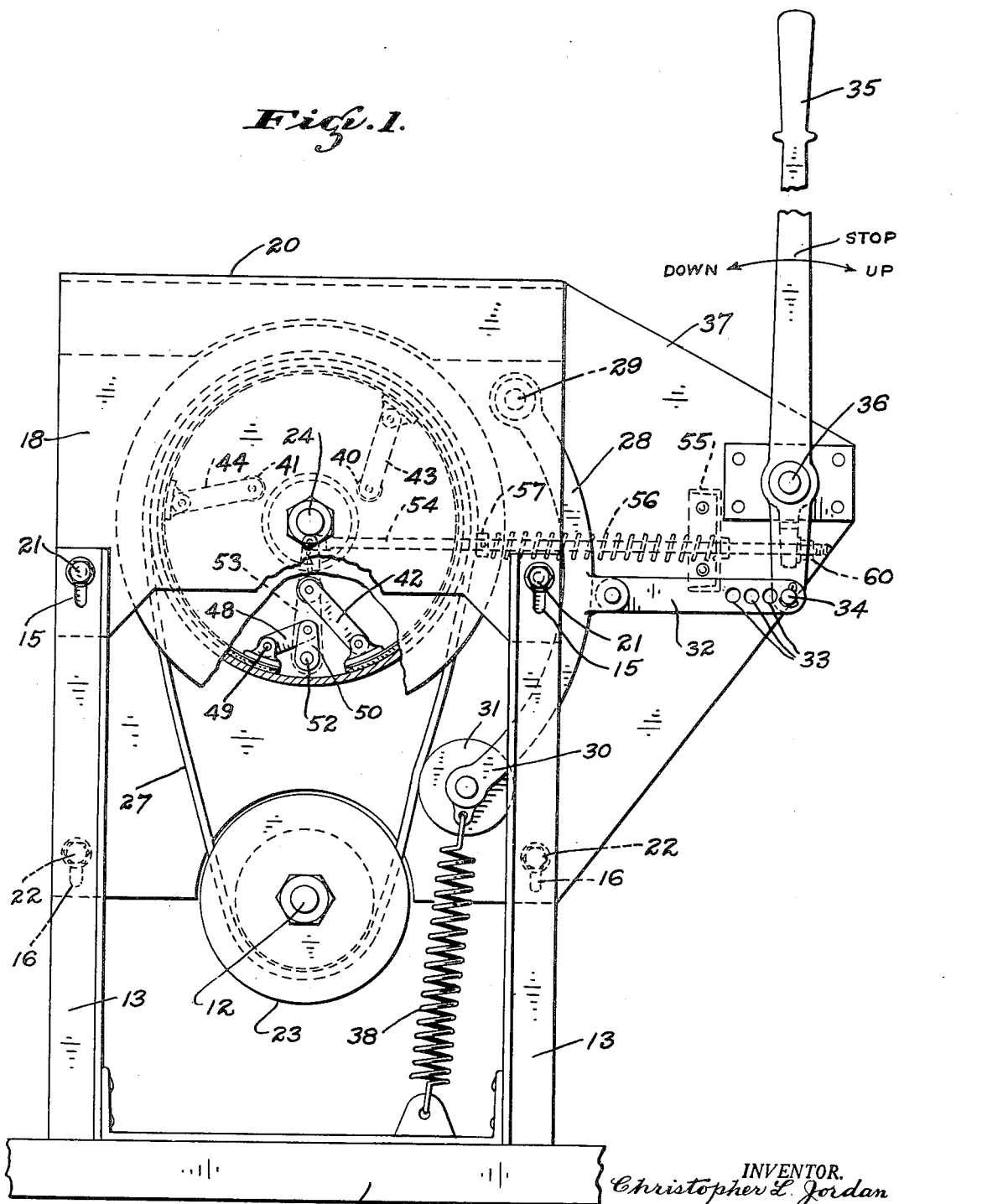
Fig. 1 is a side elevation with parts broken away of a specific embodiment of my invention.

I provide a suitable supporting member 11 which may be a part of a tractor or suitably supported on a tractor, and preferably at the rear thereof to which the engine driven rotating shaft 12 is usually extended to provide a take-off means. Uprights 13 and 14 of suitable angle iron are suitably attached to and supported on the member 11, these uprights being provided with slots 15 and 16, the framework being completed by attachment to the uprights 13 and 14 of an inverted U-shaped member 17 composed of an upright plate 18 forming an extension of the uprights 13, and a plate 19 forming an extension of the uprights 14, and one or more connecting members 20. Bolts 21, 22 passing through holes in the members 18 and 19, respectively, and through the slots 15 and 16 permit of adjustment of the height of the frame for a purpose as will appear hereinafter.

Mounted on the power driven rotating shaft 12 for rotation therewith is a drum or pulley 23, while suitably mounted in the upper framework of the machine for rotation therein is a shaft 24. Mounted on the shaft 24 are one or more winding drums 25 and a brake drum 26, the outer surface of said brake drum which is cylindrical functioning as a pulley to be rotated by a belt 27 passing thereover and over the pulley 23. This belt is loose over the two pulleys so that ordinarily the shaft 12 and pulley 23 may rotate without imparting motion to the shaft 24 through the belt 27, but means are provided for tightening such belt at will whereby rotation of the shaft 24 ensues. The adjustability of the height of the framework, as previously referred to, is provided for adjustment of the belt 27 when it stretches.

The means for tightening the loose belt sufficiently for rotating the shaft 24 comprises an arm 28 pivoted to the frame at 29, the loose end 30 of which is a pulley 31 loosely mounted for rotation therein. Linked to the arm 28 at a point midway of its ends is an arm 32 at one end thereof, while the other end of the arm 32 is provided with holes 33, any one of which will receive the pin 34 on the end of an operating lever or handle 35 pivoted at 36 to an extension member 37 suitably supported on the framework, the holes 33 thus serving for adjustment of the operative length of the arm 32.

It will thus be apparent that moving the hand lever 35 to the right, as seen on Fig. 1, will press the pulley 31 against the belt 27 to cause it to tighten on the pulleys 23 and 26 so that the shaft 24 will be rotated as long as the lever 35 is held to the right. A coiled tension spring 38 is attached at one end to the lower part 11 of the framework and at the other end to the end of the arm 28, the position of attachment of the lower end of the spring being so chosen that the arm 28 will normally be held in neutral position so that the belt 27 will hang loosely around the pulley 23. Removal of manual pressure on the operating lever 35 will thus stop rotation of the shaft 24.

Within the area of the rotating brake drum 26 and mounted on the frame bar 19 are a series of posts, in this case shown as three in number, 39, 40, 41, and arms 42, 43 and 44 are pivoted each at one end thereto, respectively, the other ends of such arms being pivoted to the cylindrical brake band 45 along the medial line thereof. The brake band carries on its outer face the brake lining 46, which brake band when not expanded does not contact with the inner face of the cylindrical brake drum 26, but does when expanded. With the specific brake which I prefer, expansion and contraction of the brake band lining is caused by moving one end thereof, for example, that indicated at 47. The arms 42, 43 and 44 are so adjusted as to position and length that movement of the end 47 to the left, as seen on Fig. 3, will cause radial expansion of the brake band and lining into contact with the brake drum to check movement thereof, while movement of the end 47 to the right, as seen in the same figure, will remove the brake band from the drum. I pivot an arm 48 at one end thereof to the end 47, as at the point 49, the other end of the arm 48 being pivoted to the upper end of the lever arm 50, as at 51, the pivot 51 being radially nearer the shaft 24 than is the pivot 49, so that movement of the lever arm 50 to the left, as seen in Fig. 3, will cause tightening of the brake, while movement of such arm in the opposite direction will cause loosening thereof. The arm 50 is fixed on a shaft 52 having a bearing in the frame part 19, and also fixed on the shaft 52 is a lever arm 53, to the end of which is pivoted a rod 54. The arm 53 may be provided with a series of holes similar to the holes 33 to vary the effective length of the arm.

The rod 54 projects through a bracket 55 fixed on the frame and a coiled compression spring 56 between this bracket and the collar 57 fixed on the arm 54 causes such arm to assume a position to the left, as seen on Figs. 1 and 3, that is, it tends to hold the brake lining 46 in contact with the face of the drum 26, and thus prevent rotation due to any pull on a cable or cables on the drum 25 so that if a weight has been hoisted by the device, such weight will be held aloft normally by means of the brake being held in braking position by the spring 56.

Fixed to and pivoting with the lever arm 35 is a projecting arm 58 bent downwardly to form a fork 59 which straddles the rod 54. A stop member, such as nuts 60, is adjustably positioned on the rod 54 so that movement of the lever 35 to the left, as seen on Fig. 1, will cause the rod 54 to move to the right and release the brake, thus permitting the suspended weight to fall.

In operation, the weight 61, which diagrammatically represents any desired apparatus or article, is suspended by a cable 62 which passes over a pulley 63, the axis of which is fixed in a plane above the member 61, the cable then extending down to and around the drum 25, may be lifted by throwing and holding the handle 35 to the right, as seen on Fig. 1, and lifting of the part 61 will continue as long as the handle is so held, the fork 59 then being away from the nuts 60, that is, to the left thereof as seen on Fig. 1. On releasing the operating handle, the spring 38 will cause the handle 35 to return to neutral position and at the same time release the belt 27 so that rotation of the shaft 24 will cease.

With the lever 35 in neutral or in up position, the brake band is in contact with the drum 26 which must rotate contraclockwise, as seen on Fig. 1, to raise the load, since with such direction or rotation with respect to position of the arms, 42, 43, 44, there will be no binding of the brake, but such binding will be effected immediately the belt 27 becomes loose and the weight 61 tends to reverse the direction of rotation of the drum 26. With the operating handle in neutral position, the weight will thus be maintained at the level to which it was raised, and to lower it the operating handle 35 is moved to the left which, as is now apparent, causes loosening of the brake and permits the weight to drop as long as the handle 35 is maintained to the left, as seen in Fig. 1, that is, in the down position, the brake parts being shown as holding the brake lining close against the drum in Fig. 1 and away therefrom in Fig. 3.

While I have described my invention with reference to various specific features of construction, yet it is to be understood that they are used merely to illustrate the invention, in its broadest aspects, and not as limiting the scope thereof, such scope being limited only by the appended claims.

Having thus described my invention, what I claim and desire to secure by Letters Patent is:

1. Hoisting mechanism comprising a driven shaft, a pulley fast on said shaft, a second pulley, a loose belt over said pulleys, a one-way brake normally affecting said second pulley, means to tighten said belt, means to release said brake, an actuating means having normally a neutral position, an "up" position and a "down" position, means to operate said means to tighten said belt when said actuating means is in "up" position, and means to operate said means to release said brake when said actuating means is in "down" position.

2. A power take-off and hoisting mechanism for use with a power take-off pulley on a tractor engine shaft, comprising an annular pulley, a slack belt over said pulleys, a one-way brake within said annular pulley ineffective thereon when said annular pulley rotates in hoisting direction and normally effective to stop rotation when said annular pulley tends to rotate in lowering direction, a pivoted arm carrying a roller at its free end in line with said belt, an actuating lever, a link connecting said pivoted arm and said lever, a brake operating lever, a rod connected to said brake operating lever, a bracket supporting said rod, a collar on said rod, a spring between said collar and said bracket normally tending to maintain said brake operating lever in position to permit said brake normally to contact the inner face of said annular pulley, an adjustable projection on said rod, a fork on said actuating lever, said fork being free to move along said rod when said lever has moved said roller into the path of said belt, and striking said projection to move said rod to release said brake when the lever is moved in the opposite direction, a frame supporting all said parts and maintaining said annular pulley in line with said engine shaft pulley, means to adjust the height of said frame thereby to adjust the slackness of said belt, and a tension spring connected to said arm adjacent said roller and to said frame.

3. Hoisting mechanism comprising a drive member, a driven member, a normally loose belt connecting said drive and driven members, a brake on the driven member and a single control means operable to tighten the belt and release the brake, said control means also being operable to release the brake without tightening the belt.

4. Hoisting mechanism comprising a drive member, a driven member, a normally loose belt forming a driving connection between said members, a normally applied brake on said driven member, a control member having an up, a down, and a stop position normally resting in said stop position, and connections between said control member, said driving connection and said brake whereby movement of the control member to up position will tighten said belt to render the driving connection operative and release the brake and movement to the down position will only release the brake.

CHRISTOPHER L. JORDAN.